Patented Oct. 8, 1929

1,730,430

UNITED STATES PATENT OFFICE

JOHANN GEORG KÄSTNER, OF FRANKFORT-ON-THE-MAIN, GERMANY

PROCESS FOR TREATING FIBROUS MATERIAL OF VEGETABLE, ARTIFICIAL, OR ANIMAL ORIGIN

No Drawing. Application filed July 20, 1928, Serial No. 294,305, and in Germany August 27, 1926.

Jute and other hard fibrous materials as well as textile of every description (wool, artificial silk, etc.) are as a rule, prior to spinning, subjected to a certain treatment with the object of holding down dust, reducing waste, lubricating the fibres and improving the spinning. This treatment called "batching" in case of jute and "topping" in case of other fibrous materials, consists in spraying over the fibrous materials emulsions of oils or fats or using suitable oils alone. Cotton for instance has not been topped up to now in practice although it was tried for years to top (lubricate) the cotton prior to spinning, but the oils and other mediums used for this purpose were of no avail. I herein refer to all such batching, topping, lubricating or greasing operations by the general term "wetting".

This invention involves the discovery that said process of batching jute and other hard fibrous materials as well as the greasing, that is, topping of textiles of every description, such as wool, artificial silk etc. is considerably facilitated and improved, no matter how the batching or greasing is effected, if there is added to the usual emulsions or oils, certain organic or inorganic substances of high colloidal character and very high viscosity, such as for instance tragacanth solutions, or preferably, a suitable decoction of carob bean kernels. In the case of a brew or decoction of carob bean kernels, the brew or decoction or the kernels themselves may or may not have been subjected to a suitable previous treatment.

For example, according to this invention, cotton or other fibrous materials can now be wetted, that is, topped with particular advantage before or even during the spinning process by simply employing diluted or undiluted decoctions of carob bean kernels or other similar suitable colloidal liquors alone or in connection with suitable hygroscopic agents such as magnesium sulphate, glycerine or even water-soluble or saponifiable oils.

The decoctions of carob bean kernels which have proved to be especially suitable, are as a rule prepared either by extracting the fruit kernels of the different kinds of carob bean trees with suitable chemicals or by simply boiling the carob bean kernels themselves for a considerable time with water. In both cases a viscous gelatine-like mass is obtained, which is frequently employed in this condition (if necessary with the addition of a suitable preserving agent) or after being filtered.

The kernels may be treated entirely or partially with chemical agents or the brew or decoction may be obtained by extraction with the aid of chemical agents or merely by simply boiling the kernels for a considerable time. The chemicals which are employed in the extraction or in the partial or complete chemical pre-treatment of the kernels may have a detrimental influence on the nature of the extracted mass itself and also in the action of the wetting processes, whether it be batching, topping or lubricating. It is therefore, decidedly preferable not to employ any chemical agents, apart from any used for preserving purposes, in the production of the brew or the preparation of the kernel.

In the ordinary process of boiling the entire kernels it is not possible even by filtration of the finished mass, to entirely remove all the husk particles. The brew or the decoction also becomes discolored. Both these disadvantages frequently have a very detrimental effect. It is, therefore, necessasry first to peel the kernels mechanically in order to remove the brown husk covering. The embryos in the interior of the kernel may also have a very adverse effect on the brew and may also discolor the same. Therefore after peeling the kernels, they are comminuted in a suitable manner in order that the germs or embryos may be more easily and completely removed. The action of the carob bean kernels is only complete if the endosperms obtained after carefully peeling the kernels and removing the germs or embryos therefrom, are ground to a very fine powder and the latter carefully dissolved and boiled with a copious addition of water.

The viscous gelatine-like mass obtained in this way, which is treated for preservation purposes with a suitable preserving agent, such as formaldehyde, has a very beneficial effect as already stated when employed in the process of batching jute and other hard fibrous materials, and in the process of topping or lubricating textiles of every kind. A particularly stable emulsion is obtained and a very intensive uniform topping action and penetration of the fibres or hairs effected with this emulsion. The fibres or hairs become remarkably soft and supple and yield a smooth round fine thread as well as a high production of yarn.

These properties naturally have a very beneficial effect on the spinning process. The loss in material in the roving process is much less than has hitherto been the case and the number of thread breakages in the fine spinning process is considerably reduced. Further, the wetting power of any emulsion, which contains an addition of such decoctions, is distinctly better, particularly if known moistening agents, for example Turkey-red oil, are employed, whereby the detrimental action on the stability of the spinning emulsion, frequently accompanying these known moistening agents, is entirely or substantially removed.

On account of the special properties of the decoctions, which depend principally on their colloidal character, the moisture in the topped or lubricated material is retained much longer and more intensively, the oxidation temperature being thereby lowered, and the hair or the fibres prevented from being detrimentally influenced, that is, from becoming brittle, owing to the oxidation temperature. The decoctions of carob bean kernels introduced into the process of batching, topping and lubricating thus replace in an absolutely natural manner the air moisture, which is lacking and apart from the other advantages mentioned, correct the temperature deviations, which are detrimental to the batched or topped material and yarn. Instead of a decoction of carob bean kernels or of their ground endosperms an aqueous solution of same made without boiling can be used.

In those cases in which it is necessary to employ the decoctions in a particular concentration as well as in a more liquid condition, the brews or decoctions of carob bean kernels or of the ground perisperms of the carob bean kernels may also be previously treated in a suitable manner with a malt ferment or a similarly acting material.

An extremely important point and one which decides the final result when said decoctions or colloidal liquors are used in combination with the regular emulsions, oils, fats, etc., is the quantity employed of the above mentioned decoctions which should amount to about 1 to 30% of the usual proportions of spinning oil (such as olein, earthnut-oil, olive-oil, etc.) or of train oil, fat and soap. It is also possible in a rational manner and with equally good results to diminish the usually employed batching and greasing agents by about 1 to 30% and to replace them by the same or a greater quantity of suitable brews or decoctions of carob bean kernels, the amount added depending on the working conditions.

In some cases especially, for example when batching jute, decoctions which have been obtained from more coarsely prepared kernels (sometimes even from whole kernels) may be employed. It is absolutely immaterial for the specified percentage additions of the above mentioned brews, decoctions or extractions, in what manner the same have been obtained, as owing to their colloidal properties, they will act in the above mentioned manner when present in the approximate specified proportions. It is however, in many cases advantageous that the kernels or the powder or the decoction therefrom, should be prepared most carefully and if possible without chemical agents.

In case decoctions, extracts or brews of carob bean kernels or of their finely ground endosperms are used, it is advisable to add the aqueous colloidal substances, that is, liquors after having prepared the emulsions in the usual way.

Having thus described my invention, what I claim as new and desire to secure by Letters Patent is:

1. A process for treating fibrous materials of vegetable, artificial or animal origin, which includes adding a highly colloidal and highly viscous organic substance, to the usual emulsions, spinning oils or fats.

2. A process for treating fibrous materials of vegetable, artificial or animal origin, which includes adding a highly colloidal and highly viscous decoction of carob bean kernels made from the finest ground endosperms of the kernels to the usual emulsions, spinning oils or fats.

3. A process for treating fibrous materials of vegetable, artificial or animal origin, which includes adding a highly colloidal and highly viscous substance to the usual emulsions, spinning oils or fats.

4. A process of treating cotton fibre, which includes wetting it with a decoction of finely ground endosperms of the carob bean kernels.

5. A process of treating fibrous material, which includes wetting said fibrous material with a decoction of the carob bean kernels reduced to a thin consistency by means of malt-ferments and concentrated by evaporation.

6. A process of treating fibrous material, which includes wetting it with an oleaginous material having aboute 30% of a colloidal, highly viscous substance.

7. A process of treating fibrous material, which includes wetting it with an oleaginous material having about 30% of a decoction of carob bean kernels.

In testimony whereof I hereunto affix my signature this 5th day of July, 1928.

JOHANN GEORG KÄSTNER.